US008774282B2

(12) United States Patent
Song

(10) Patent No.: US 8,774,282 B2
(45) Date of Patent: Jul. 8, 2014

(54) ILLUMINATION COMPENSATION METHOD AND APPARATUS AND VIDEO ENCODING AND DECODING METHOD AND APPARATUS USING THE ILLUMINATION COMPENSATION METHOD

(75) Inventor: Byung-cheol Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1583 days.

(21) Appl. No.: 11/861,573

(22) Filed: Sep. 26, 2007

(65) Prior Publication Data

US 2008/0130750 A1 Jun. 5, 2008

(30) Foreign Application Priority Data

Dec. 1, 2006 (KR) .................. 10-2006-0120949

(51) Int. Cl.
*H04N 7/12* (2006.01)
(52) U.S. Cl.
USPC ................................. 375/240.24; 375/240.12
(58) Field of Classification Search
None
See application file for complete search history.

(56) References Cited

U.S. PATENT DOCUMENTS

| 4,949,166 | A | * | 8/1990 | Isnardi | 348/493 |
|---|---|---|---|---|---|
| 5,619,591 | A | * | 4/1997 | Tsang et al. | 382/166 |
| 5,870,500 | A | * | 2/1999 | Daoudi et al. | 382/236 |
| 6,075,905 | A | * | 6/2000 | Herman et al. | 382/284 |
| 6,272,178 | B1 | * | 8/2001 | Nieweglowski et al. | 375/240.12 |
| 6,509,930 | B1 | * | 1/2003 | Hirano et al. | 348/452 |
| 6,617,797 | B2 | * | 9/2003 | Higuchi et al. | 315/169.1 |
| 6,895,051 | B2 | * | 5/2005 | Nieweglowski et al. | 375/240.03 |
| 7,184,595 | B2 | * | 2/2007 | Hel-Or et al. | 382/218 |
| 7,369,181 | B2 | * | 5/2008 | Kang et al. | 348/606 |
| 7,404,645 | B2 | * | 7/2008 | Margulis | 353/31 |
| 7,483,486 | B2 | * | 1/2009 | Mantiuk et al. | 375/240.03 |
| 7,734,089 | B2 | * | 6/2010 | Zhang et al. | 382/181 |
| 7,852,327 | B2 | * | 12/2010 | Chen et al. | 345/204 |
| 7,924,923 | B2 | * | 4/2011 | Lee et al. | 375/240.16 |
| 7,970,221 | B2 | * | 6/2011 | Yang | 382/233 |
| 8,045,813 | B2 | * | 10/2011 | Lee et al. | 382/238 |
| 2002/0044604 | A1 | * | 4/2002 | Nieweglowski et al. | 375/240.03 |
| 2005/0084011 | A1 | * | 4/2005 | Song et al. | 375/240.12 |
| 2005/0094892 | A1 | * | 5/2005 | Choe et al. | 382/274 |

(Continued)

FOREIGN PATENT DOCUMENTS

| CN | 1848959 A | 10/2006 |
|---|---|---|
| KR | 2004-0105964 A | 12/2004 |
| KR | 2006-0060350 A | 6/2006 |

OTHER PUBLICATIONS

Nuno M. M. Rodrigues, "Hierarchical Motion Compensation With Spatail and Luminance Transformations", 2001, IEEE, pp. 518-521.*

(Continued)

*Primary Examiner* — Ayaz Sheikh
*Assistant Examiner* — Faiyazkhan Ghafoerkhan
(74) *Attorney, Agent, or Firm* — Sughrue Mion, PLLC

(57) ABSTRACT

Provided are an illumination compensation method and apparatus and video encoding/decoding methods and apparatuses using the illumination compensation method. The illumination compensation method for a reference block used for motion estimation includes receiving pixel values of reconstructed neighboring pixels around a current block to be encoded and pixel values of reconstructed neighboring pixels around the reference block, and performing illumination compensation with respect to the reference block based on the input pixel values of reconstructed neighboring pixels around the current block and the input pixel values of reconstructed neighboring pixels around the reference block.

23 Claims, 7 Drawing Sheets

(56) References Cited

U.S. PATENT DOCUMENTS

2006/0008038 A1* 1/2006 Song et al. ............... 375/350
2006/0268166 A1* 11/2006 Bossen et al. ............ 348/390.1
2006/0285587 A1* 12/2006 Luo et al. ................. 375/240.2
2007/0053569 A1* 3/2007 Douglass et al. .......... 382/128
2007/0237098 A1* 10/2007 Wang ........................ 370/256
2008/0144722 A1* 6/2008 Park et al. ............... 375/240.25

OTHER PUBLICATIONS

Nuno M. M. Rodrigues, "Low Bit Rate Video Coding With Spatial and Luminance Transformations", 2001, IEEE.*

* cited by examiner

FIG. 8

| 1 | 2 |
|---|---|
| 3 | 4 |

FIG. 9

| 1 | 2 | 5 | 6 |
|---|---|---|---|
| 3 | 4 | 7 | 8 |
| 9 | 10 | 13 | 14 |
| 11 | 12 | 15 | 16 |

ILLUMINATION COMPENSATION METHOD AND APPARATUS AND VIDEO ENCODING AND DECODING METHOD AND APPARATUS USING THE ILLUMINATION COMPENSATION METHOD

CROSS-REFERENCE TO RELATED PATENT APPLICATION

This application claims priority from Korean Patent Application No. 10-2006-0120949, filed on Dec. 1, 2006, in the Korean Intellectual Property Office, the disclosure of which is incorporated herein in its entirety by reference.

BACKGROUND OF THE INVENTION

1. Field of the Invention

Methods and apparatuses consistent with the present invention relate to illumination compensation, and more particularly, to illumination compensation for video encoding and decoding.

2. Description of the Related Art

When multi-view coding (MVC) for three-dimensional (3D) display applications is performed between adjacent views during prediction between the adjacent views, changes in illumination may occur due to an incompletely calibrated camera, different perspective projection directions, different reflection effects, and the like, causing degradation in coding efficiency. Singe-view coding may also lead to degradation in coding efficiency during scene switching due to an illumination change.

To solve this problem, H.264 adopts weighted prediction. A weighted prediction scheme is applied to motion compensation at a slice level and illumination is compensated for according to an appropriate weighted factor W and an additional offset 0. Illumination change-adaptive motion estimation/motion compensation (ICA ME/MC) is an improvement on the weighted prediction scheme.

ICA ME/MC is performed in units of a 16×16 block for Y components and a differential value of illumination change (DVIC) is obtained for each macroblock.

ICA ME/MC has two modes: one is an IC-inter 16×16 mode that uses ICA ME/MC and is used for predictive (P) or bidirectional predictive (B) slices and the other is an IC-direct 16×16 mode that does not use ICA ME and is used only for B slices. In order to compensate for a local illumination change, a 1-bit flag, i.e., mb_ic_flag, is required for each of the IC-inter 16×16 mode and the IC-direct 16×16 mode.

Since DVIC for the current block has a high correlation with DVIC for neighboring blocks that are adjacent to the current block, DVIC for the current block is performed by encoding differences between DVIC for the current block and DVIC for the neighboring blocks.

Hereinafter, ICA ME/MC performed in units of a macroblock in the IC-inter 16×16 mode will be described.

For ICA ME/MC, a new sum of absolute differences (SAD) has to be defined. When a pixel at (i, j) in the current frame is referred to as f(i, j) and a pixel at (i, j) in the reference frame is referred to as r(i, j), an SAD for S×T blocks is calculated as follows, in which S×T may be 16×16, 16×8, 8×16, 8×8, 8×4, 4×8, or 4×4.

$$SAD(x, y) = \sum_{i=m}^{m+S-1} \sum_{j=n}^{n+T-1} |f(i, j) - r(i+x, j+y)|, \quad (1)$$

where (x, y) indicates a candidate motion vector and (i, j) indicates the position of the current block.

To compensate for an illumination change, a new SAD is required as follows:

$$M_{cur} = \frac{1}{S \times T} \sum_{i=m}^{m+S-1} \sum_{j=n}^{n+T-1} f(i, j) \quad (2)$$

$$M_{ref}(p, q) = \frac{1}{S \times T} \sum_{i=p}^{p+S-1} \sum_{j=q}^{q+T-1} r(i, j),$$

where $M_{cur}$ indicates an average of pixels values in the current block, $M_{ref}$ indicates an average of pixels values in the reference block, and (p, q) indicates the position of the reference block. A new SAD, i.e., NewSAD (x, y), is given as follows:

$$NewSAD(x, y) = \quad (3)$$

$$\sum_{i=m}^{m+S-1} \sum_{j=n}^{n+T-1} |\{f(i, j) - M_{cur}\} - \{r(i+x, j+y) - M_{ref}(m+x, n+y)\}|$$

A block, e.g., a 16×16 block, that minimizes NewSAD (x, y) based on Equation 3 is searched for and a motion vector corresponding to the found block is also searched for.

Once a motion vector MV(x', y') that minimizes NewSAD (x, y) is found, an illumination compensation residual signal NewR(i, j) is determined as follows:

$$NewR(i, j) = \{f(i, j) - M_{cur}\} - \left\{ \begin{array}{l} r(i+x', j+y') - \\ M_{ref}(m+x', n+y') \end{array} \right\} \quad (4)$$

$$= \{f(i, j) - r(i+x', j+y')\} -$$

$$\{M_{cur} - M_{ref}(m+x', n+y')\}$$

$$= \{f(i, j) - r(i+x', j+y')\} - DVIC$$

In order to indicate whether ICA ME/MC is used, the 1-bit flag, mb_ic_flag, is stored in a syntax. A differential pulse code modulation (DPCM) value for DVIC is also included in the syntax. If mb_ic_flag is '0', it indicates that ICA MC is not performed for the current block. If mb_ic_flag is '1', it indicates that ICA MC is performed for the current block.

When mb_ic_flag is '1', an ICA ME/MC unit of a decoder obtains a reconstructed pixel as follows:

$$f'(i, j) = \{NewR''(x', y', i, j) + r(i+x', j+y')\} + \quad (5)$$

$$\{M_{cur} - M_{ref}(m+x', n+y')\}$$

$$= \{NewR''(x', y', i, j) + r(i+x', j+y')\} + DVIC,$$

where NewR''(i, j) indicates a reconstructed illumination compensation residual signal and f'(i, j) indicates a reconstructed pixel in the current frame.

Since DVIC information has to be transmitted according to conventional ICA ME/MC, coding efficiency is degraded.

SUMMARY OF THE INVENTION

The present invention provides an illumination compensation method and apparatus, in which transmission of differential value of illumination change (DVIC) information is not required, and a video encoding/decoding method and apparatus using said illumination compensation method.

According to an aspect of the present invention, there is provided an illumination compensation method for a reference block used for motion estimation. The illumination compensation method includes receiving pixel values of reconstructed neighboring pixels around a current block to be encoded and pixel values of reconstructed neighboring pixels around the reference block, and performing illumination compensation with respect to the reference block based on the input pixel values of reconstructed neighboring pixels around the current block and the input pixel values of reconstructed neighboring pixels around the reference block.

The performing of the illumination compensation may include calculating illumination compensation parameters with respect to the reference block based on a correlation between the pixel values of the reconstructed neighboring pixels around the current block and the pixel values of the reconstructed neighboring pixels around the reference block and generating an illumination-compensated reference block based on the calculated illumination compensation parameters.

The performing of the illumination compensation may also include determining values of $a_{x,y}$ and $b_{x,y}$ that minimize J in the equation $$J = \sum_{i=0}^{15} [f'(i,-1) - a_{x,y} \times r'_{x,y}(i,-1) - b_{x,y}]^2 + \sum_{j=0}^{15} [f'(-1,j) - a_{x,y} \times r'_{x,y}(-1,j) - b_{x,y}]^2$$

and generating the illumination-compensated reference block based on $\tilde{f}(i,j) = a_{x,y} \cdot r'_{x,y}(i,j) + b_{x,y}$ using the determined values of $a_{x,y}$ and $b_{x,y}$, where $a_{x,y}$ and $b_{x,y}$ depend on a motion vector (x, y) and are constants with respect to the motion vector (x, y), f'(i,−1) and f'(−1,j) indicate the pixel values of the reconstructed neighboring pixels around the current block, $r'_{x,y}(i,-1)$ and $r'_{x,y}(-1,j)$ indicate the pixel values of the reconstructed neighboring pixels around the reference block, $r'_{x,y}(i,j)$ indicates a motion-compensated reference block, and $\tilde{f}(i, j)$ indicates the illumination-compensated reference block.

The performing of the illumination compensation may also include generating the illumination-compensated reference block using an average of differences between the pixel values of the reconstructed neighboring pixels around the current block and the pixel values of the reconstructed neighboring pixels around the reference block.

The performing of the illumination compensation may also include generating the illumination-compensated reference block using a difference between an average of the pixel values of the reconstructed neighboring pixels around the current block and an average of the pixel values of the reconstructed neighboring pixels around the reference block.

The reference block may be a block included in a reference block among reconstructed frames of an adjacent view in multi-view coding.

According to another aspect of the present invention, there is provided an illumination compensation apparatus for a reference block used for motion estimation. The illumination compensation apparatus includes an illumination compensation unit that performs illumination compensation, with respect to the reference block, based on pixel values of reconstructed neighboring pixels around a current block to be encoded and pixel values of reconstructed neighboring pixels around the reference block.

The illumination compensation unit may include a calculation unit that calculates illumination compensation parameters for the illumination compensation, with respect to the reference block, based on a correlation between the pixel values of the reconstructed neighboring pixels around the current block and the pixel values of the reconstructed neighboring pixels around the reference block and an illumination-compensated reference block generation unit that generates an illumination-compensated reference block based on the calculated illumination compensation parameters.

According to another aspect of the present invention, there is provided a video encoding method based on illumination compensation. The video encoding method includes performing illumination compensation, with respect to a reference block, used for motion estimation based on pixel values of reconstructed neighboring pixels around a current block to be encoded and pixel values of reconstructed neighboring pixels around the reference block and performing motion estimation based on the illumination-compensated reference block.

According to another aspect of the present invention, there is provided a video encoding apparatus based on illumination compensation. The video encoding apparatus includes an illumination compensation unit that performs illumination compensation, with respect to a reference block, used for motion estimation based on pixel values of reconstructed neighboring pixels around a current block to be encoded and pixel values of reconstructed neighboring pixels around the reference block and a motion estimation unit that performs motion estimation based on the illumination-compensated reference block.

According to another aspect of the present invention, there is provided a video decoding method based on illumination compensation. The video decoding method includes performing illumination compensation, with respect to a reference block, used for motion compensation based on pixel values of reconstructed neighboring pixels around a current block to be decoded and pixel values of reconstructed neighboring pixels around the reference block and performing motion compensation based on the illumination-compensated reference block.

According to another aspect of the present invention, there is provided a video decoding apparatus based on illumination compensation. The video decoding apparatus includes an illumination compensation unit that performs illumination compensation, with respect to a reference, block used for motion compensation based on pixel values of reconstructed neighboring pixels around a current block to be decoded and pixel values of reconstructed neighboring pixels around the reference block and a motion compensation unit that performs motion compensation based on the illumination-compensated reference block.

According to another aspect of the present invention, there is provided a computer-readable recording medium having recorded thereon a program for implementing an illumination compensation method for a reference block used for motion estimation. The illumination compensation method includes receiving pixel values of reconstructed neighboring pixels around a current block to be encoded and pixel values of reconstructed neighboring pixels around the reference block and performing illumination compensation, with respect to the reference block, based on the input pixel values of reconstructed neighboring pixels around the current block and the input pixel values of reconstructed neighboring pixels around the reference block.

According to another aspect of the present invention, there is provided a computer-readable recording medium having recorded thereon a program for implementing a video encoding method based on illumination compensation. The video encoding method includes performing illumination compensation, with respect to a reference block, used for motion estimation based on pixel values of reconstructed neighboring pixels around a current block to be encoded and pixel values of reconstructed neighboring pixels around the reference block and performing motion estimation based on the illumination-compensated reference block.

According to another aspect of the present invention, there is provided a computer-readable recording medium having recorded thereon a program for implementing a video decoding method based on illumination compensation. The video decoding method includes performing illumination compensation, with respect to a reference block, used for motion compensation based on pixel values of reconstructed neighboring pixels around a current block to be decoded and pixel values of reconstructed neighboring pixels around the reference block and performing motion compensation based on the illumination-compensated reference block.

BRIEF DESCRIPTION OF THE EXEMPLARY EMBODIMENTS OF THE DRAWINGS

The above and other aspects of the present invention will become more apparent by describing in detail exemplary embodiments thereof with reference to the attached drawings in which:

FIG. 8 is a view for explaining an encoding order in an 8×8 mode; and

FIG. 9 is a view for explaining an encoding order in a 4×4 mode.

DETAILED DESCRIPTION OF THE INVENTION

Figure 1:
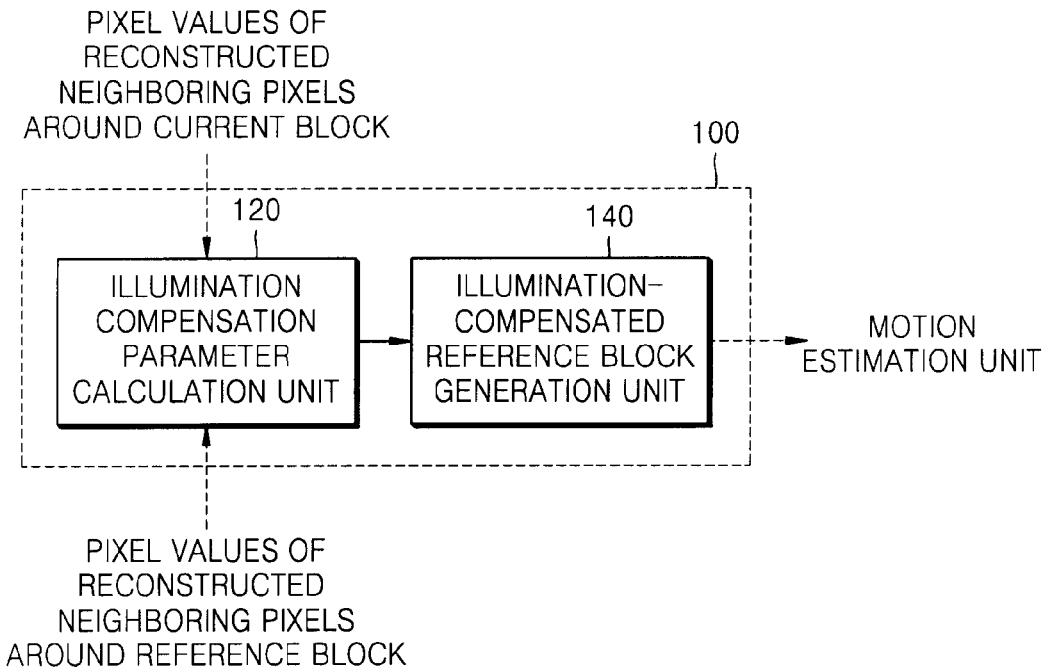
FIG. 1 is a block diagram of an illumination compensation apparatus according to an exemplary embodiment of the present invention.

Hereinafter, an exemplary embodiment of the present invention will be described in detail with reference to the accompanying drawings. Like reference numerals refer to like elements throughout the figures.

FIG. 1 is a block diagram of an illumination compensation apparatus 100 according to an exemplary embodiment of the present invention.

Referring to FIG. 1, the illumination compensation apparatus 100 includes an illumination compensation parameter calculation unit 120 and an illumination-compensated reference block generation unit 140.

The illumination parameter calculation unit 120 calculates illumination compensation parameters based on pixel values of reconstructed neighboring pixels around the current block and pixel values of reconstructed neighboring pixels around a reference block and outputs the calculated illumination compensation parameters to the illumination-compensated reference block generation unit 140. In single-view coding, the reference block may be a block in a reconstructed previous frame. In multi-view coding, the reference block may be a block in a reference block among reconstructed frames of an adjacent view.

Calculation of the illumination compensation parameter according to the present invention will be described with reference to FIGS. 2A and 2B. Descriptions will be made separately in relation to a 16×16 mode, an 8×8 mode, a 4×4 mode, and an adaptive mode.

Calculation of the illumination compensation parameter in the 16×16 mode will now be described with reference to FIGS. 2A and 2B. The calculation in the other modes will be described later.

Figure 2A:
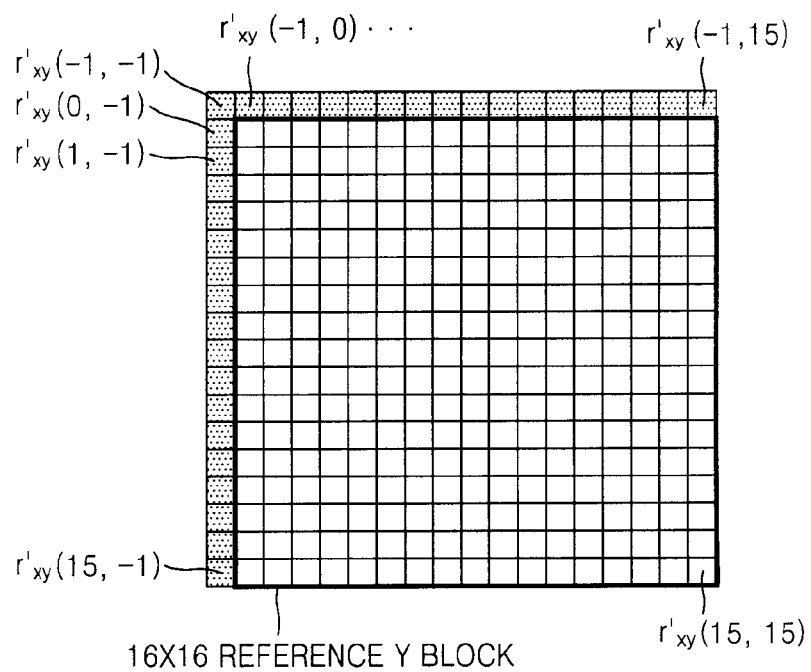
FIGS. 2A and 2B are views for explaining calculation of an illumination compensation parameter according to an exemplary embodiment of the present invention.

In FIG. 2A, a block marked with a bold line is a 16×16 Y block, which is a reconstructed reference block corresponding to a motion vector (x, y) in a reference frame. A reconstructed pixel at (i, j) in the reference block corresponding to the motion vector (x, y) is referred to as $r'_{x,y}(i, j)$. Here, the apostrophe ' means a reconstructed value. Dotted pixels are reconstructed neighboring pixels around the current block. A reference frame is a previous frame in the case of single-view coding and is a reconstructed frame of an adjacent view in multi-view coding.

Figure 2B:
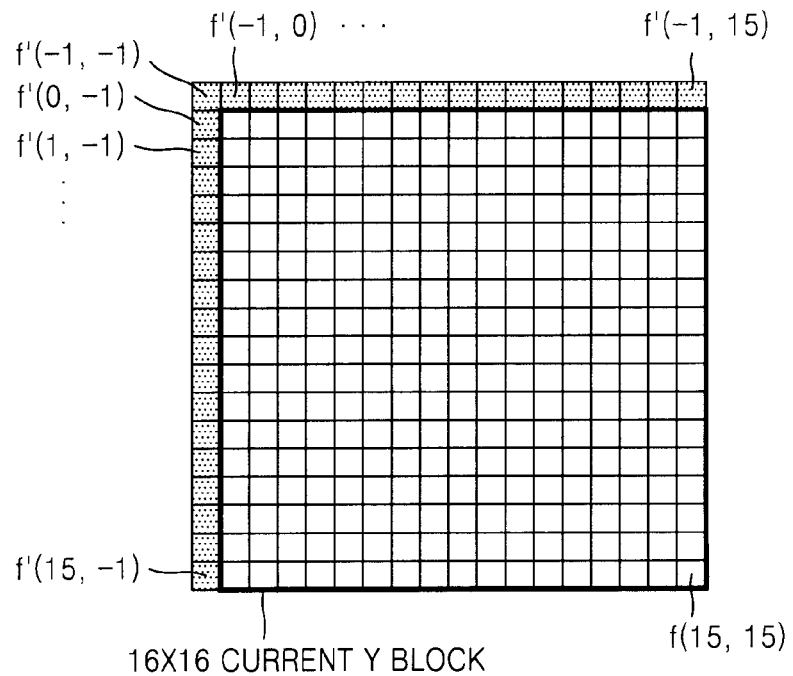

In FIG. 2B, a block marked with bold lines is a 16×16 current Y block. The original pixel at (i, j) in the current block is referred to as f(i, j). Dotted neighboring pixels are used for motion estimation compensation. The neighboring pixels used for motion estimation compensation have already been reconstructed. As in FIG. 2A, the apostrophe ' means a reconstructed value.

A predictor of the pixel f(i, j) in the current block can be expressed as a linear function of $r'_{x,y}(i, j)$, as follows:

$$\tilde{f}(i,j) = a_{x,y} \cdot r'_{x,y}(i,j) + b_{x,y} \qquad (6)$$

Predictors obtained using Equation 6 are clipped to be in the range [0, 255] in the case of an 8-bit image.

As in Equation 6, once $a_{x,y}$ and $b_{x,y}$ are determined, the predictor can be calculated. In the current exemplary embodiment of the present invention, the illumination compensation parameters $a_{x,y}$ and $b_{x,y}$ corresponding to the motion vector (x, y) are calculated using the neighboring pixels illustrated in FIGS. 2A and 2B based on the fact that the illumination of pixels in the current block is not much different from that of neighboring pixels around the current block.

In other words, since $a_{x,y}$ and $b_{x,y}$ can be determined using neighboring reconstructed pixels of the current block and the reference block, a decoder can calculate $a_{x,y}$ and $b_{x,y}$ without a need for an encoder to transmit $a_{x,y}$ and $b_{x,y}$ to the decoder using a predetermined syntax, thereby reducing transmission data.

Three exemplary embodiments for determining $a_{x,y}$ and $b_{x,y}$ according to the present invention, i.e., linear regression, an average-of-difference based prediction (ADP), and a difference-of-average based prediction (DAP) will be now described.

Linear regression will be first described with reference to Equation 7 and Equation 8.

In the linear regression method, values of $a_{x,y}$ and $b_{x,y}$ that minimize a value of Equation 7 can be determined.

$$J = \sum_{i=0}^{15} [f'(i,-1) - a_{x,y} \times r'_{x,y}(i,-1) - b_{x,y}]^2 + \sum_{j=0}^{15} [f'(-1,j) - a_{x,y} \times r'_{x,y}(-1,j) - b_{x,y}]^2, \quad (7)$$

where $f'(i,-1)$ and $f'(-1,j)$ indicate pixel values of neighboring pixels around the current block, $r'_{x,y}(i,-1)$ and $r'_{x,y}(-1,j)$ indicate pixel values of neighboring pixels around the motion-compensated reference block, and $a_{x,y}$ and $b_{x,y}$ depend on the motion vector (x, y) and are constants with respect to the motion vector (x, y).

Using a partial differential method, values of $a_{x,y}$ and $b_{x,y}$ that minimize J of Equation 7 can be given as follows:

$$a_{x,y} = \frac{N \sum_{n=1}^{N} f'(n) \cdot r'_{x,y}(n) - \sum_{n=1}^{N} f'(n) \sum_{n=1}^{N} r'_{x,y}(n)}{N \sum_{n=1}^{N} (r'_{x,y}(n))^2 - \left( \sum_{n=1}^{N} r'_{x,y}(n) \right)^2}, \quad (8)$$

$$b_{x,y} = \frac{\sum_{n=1}^{N} f'(n) - a_{x,y} \cdot \sum_{n=1}^{N} r'_{x,y}(n)}{N},$$

where, when each of the current block and the reference block is 16×16 in size, N is equal to 32, $f'(n)$ indicates a reconstructed neighboring pixel around the current block and is one of $f'(i,-1)$ and $f'(-1,j)$, and $r'_{x,y}(n)$ is one of $r'_{x,y}(i,-1)$ and $r'_{x,y}(-1,j)$. Here, i and j may be in the range between 0 and 15.

Calculation of $a_{x,y}$ and $b_{x,y}$ using ADP will now be described with reference to Equation 9.

According to ADP, only $b_{x,y}$ is calculated while fixing $a_{x,y}$ to 1. In other words, $b_{x,y}$ is determined as an average of differences between pixel values of reconstructed neighboring pixels as follows:

$$b_{x,y} = \frac{\sum_{i=0}^{15} (f'(i,-1) - r'_{x,y}(i,-1)) + \sum_{j=0}^{15} (f'(-1,j) - r'_{x,y}(-1,j))}{32} \quad (9)$$

Hereinafter, calculation of $a_{x,y}$ and $b_{x,y}$ using DAP will be described with reference to Equation 10.

In DAP, only $b_{x,y}$ is calculated while fixing $a_{x,y}$ to 1. In other words, $b_{x,y}$ is determined as a difference between averages of pixel values of reconstructed neighboring pixels as follows:

$$b_{x,y} = \frac{\sum_{i=0}^{15} f'(i,-1) + \sum_{j=0}^{15} f'(-1,j)}{32} - \frac{\sum_{i=0}^{15} r'_{x,y}(i,-1) + \sum_{j=0}^{15} r'_{x,y}(-1,j)}{32} \quad (10)$$

As discussed above, the illumination compensation parameter calculation unit 120 calculates the illumination compensation parameters $a_{x,y}$ and $b_{x,y}$ using linear regression, ADP, and DAP and outputs the calculated $a_{x,y}$ and $b_{x,y}$ to the illumination-compensated reference block generation unit 140.

The illumination-compensated reference block generation unit 140 generates an illumination-compensated reference block composed of the predictors for the pixel f(i, j) obtained using Equation 6 and outputs the generated illumination-compensated reference block to a motion estimation unit (not shown).

Figure 3:
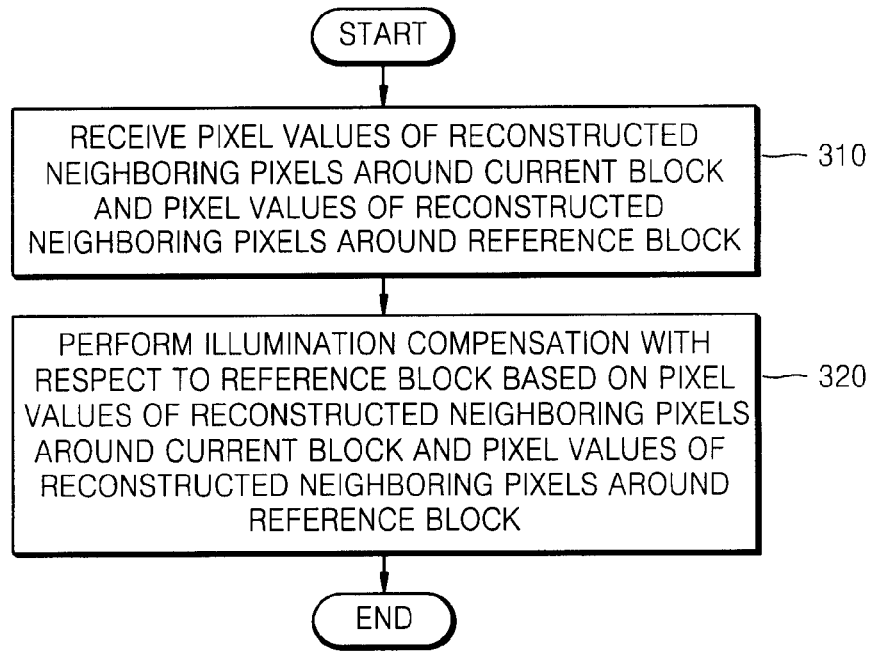
FIG. 3 is a flowchart illustrating an illumination compensation method according to an exemplary embodiment of the present invention.

FIG. 3 is a flowchart illustrating an illumination compensation method implemented by the illumination compensation apparatus 100.

In operation 310, pixel values of reconstructed neighboring pixels around the current block and pixel values of reconstructed neighboring pixels around a reference block are input. In single-view coding, the reference block may be a block in a reconstructed previous frame. In multi-view coding, the reference block may be a block in a reference block among reconstructed frames of an adjacent view.

In operation 320, illumination compensation is performed with respect to the reference block based on the input pixel values of the reconstructed neighboring pixels around the current block and the input pixel values of the reconstructed neighboring pixels around the reference block. In operation 320, illumination compensation parameters are generated based on a correlation between the input pixel values of the reconstructed neighboring pixels around the current block and the input pixel values of the reconstructed neighboring pixels around the reference block in the current frame, as in Equations 7 through 10, and an illumination-compensated reference block is generated using the generated illumination compensation parameters using Equation 6.

Figure 4:
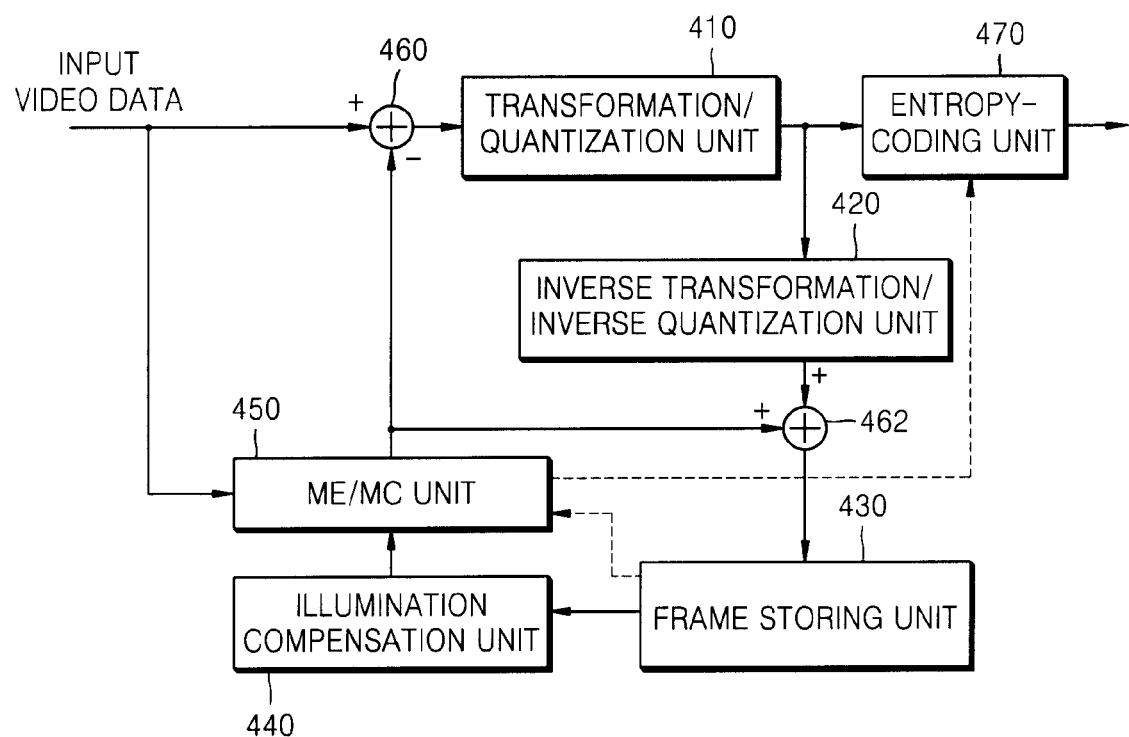
FIG. 4 is a block diagram of a video encoding apparatus using an illumination compensation method according to an exemplary embodiment of the present invention.

FIG. 4 is a block diagram of a video encoding apparatus using the illumination compensation method according to an exemplary embodiment of the present invention.

The video encoding apparatus according to the present invention includes a transformation/quantization unit 410, an inverse transformation/inverse quantization unit 420, a frame storing unit 430, an illumination compensation unit 440, an ME/MC unit 450, a first addition unit 460, a second addition unit 462, and an entropy-coding unit 470.

The transformation/quantization unit 410 transforms input video data to remove the spatial redundancy of the input video data. The transformation/quantization unit 410 quantizes transform coefficients obtained by performing transform encoding using a predetermined quantization step, thereby obtaining two-dimensional (2D) N×M data composed of the quantized transform coefficients. A DCT may be used as the transform. The quantization is performed using a predetermined quantization step.

An inverse quantization/inverse transform unit 420 inversely quantizes the video data that is quantized by the transformation/quantization unit 410 and inversely transforms the inversely quantized video data using, for example, an inverse DCT (IDCT).

The second addition unit 462 adds reconstructed video data obtained by the inverse transform/inverse quantization unit 420 to prediction video data output from the ME/MC unit 450, thereby generating reconstructed video data.

The frame storing unit 430 stores the reconstructed video data obtained by the second addition unit 462 in frame units.

The illumination compensation unit 440 receives pixel values of reconstructed neighboring pixels around the current block and pixel values of reconstructed neighboring pixels around the reference block, which are input from the frame storing unit 430, in order to generate an illumination-compensated reference block, and outputs the generated illumination-compensated reference block to the ME/MC unit 450. When the input video data is based on MVC, the reconstructed neighboring pixels around the reference block may be those located in a frame of an adjacent view. In this case, the reconstructed neighboring pixels around the reference block may be input from an MVC based reference frame storing unit (not shown).

The illumination compensation unit 440 functions in the same way as the illumination compensation apparatus 100 illustrated in FIG. 1 and thus will not be described in detail for simplicity of explanation.

The ME/MC unit 450 estimates a motion vector MV for each macroblock based on the input video data of the current frame and the illumination-compensated reference block output from the illumination compensation unit 440. The ME/MC unit 450 also generates a motion-compensated prediction area P based on the estimated motion vector, e.g., a 16×16 area selected by motion estimation, and outputs the motion-compensated prediction area P to the first addition unit 460.

In other words, the ME/MC unit 450 obtains an illumination-compensated (IC) SAD corresponding to the current block based on the illumination-compensated reference block obtained by the illumination compensation unit 440 as follows. The ME/MC unit 450 also compares IC SADs and searches for a final motion vector.

$$IC - SAD(x, y) = \sum_{i=0}^{15} \sum_{j=0}^{15} |f(i, j) - \bar{f}(i, j)| \quad (11)$$

$$= \sum_{i=0}^{15} \sum_{j=0}^{15} |f(i, j) - a_{x,y} \cdot r'_{x,y}(i, j) - b_{x,y}|,$$

where $a_{x,y}$ and $b_{x,y}$ depend on the motion vector (x, y) and are constants with respect to the motion vector (x, y).

The ME/MC unit 450 may also include a comparison unit (not shown).

The comparison unit compares the efficiency of coding based on the input video data of the current frame and the illumination-compensated reference block output from the illumination compensation unit 440 with the efficiency of coding based on the input video data of the current frame and a non-illumination-compensated reference block output from the frame storing unit 430, and selects one having the higher efficiency. At this time, the ME/MC unit 450 generates the motion-compensated prediction area P obtained using selected ME/MC and outputs the motion-compensated prediction area P to the first addition unit 460.

Additionally, 1-bit flag information indicating whether illumination compensation is applied may be transmitted to a decoder using a predetermined syntax in units of a macroblock. Also, the performance of illumination compensation may be evaluated in units of a group of pictures (GOP) or a slice and flag information indicating whether illumination compensation is applied may be transmitted in units of a GOP or a slice.

The first addition unit 460 inputs a difference between the original video data and a predictor output from the ME/MC unit 450 to the transformation/quantization unit 410 in units of a predetermined block. When the final motion vector, (p, q), for the current block is determined by a motion vector search, the first addition unit 460 calculates a residue (p, q) for the current block as given below and outputs the residue (p, q) to the transformation/quantization unit 410.

$$\text{residue}(p,q) = \{f(i,j) - a_{p,q} \cdot r'_{p,q}(i,j) - b_{p,q} | 0 \le i,j \le 15\} \quad (12),$$

where $a_{p,q}$ and $b_{p,q}$ differ with the motion vector (p, q) and are constants with respect to the motion vector (p, q).

The entropy-coding unit 470 receives the quantized transform coefficients output from the transformation/quantization unit 410 and the motion vector output from the ME/MC unit 450 and performs entropy-coding on the received transform coefficients and motion vector, thereby outputting a final encoded bitstream.

Figure 5:
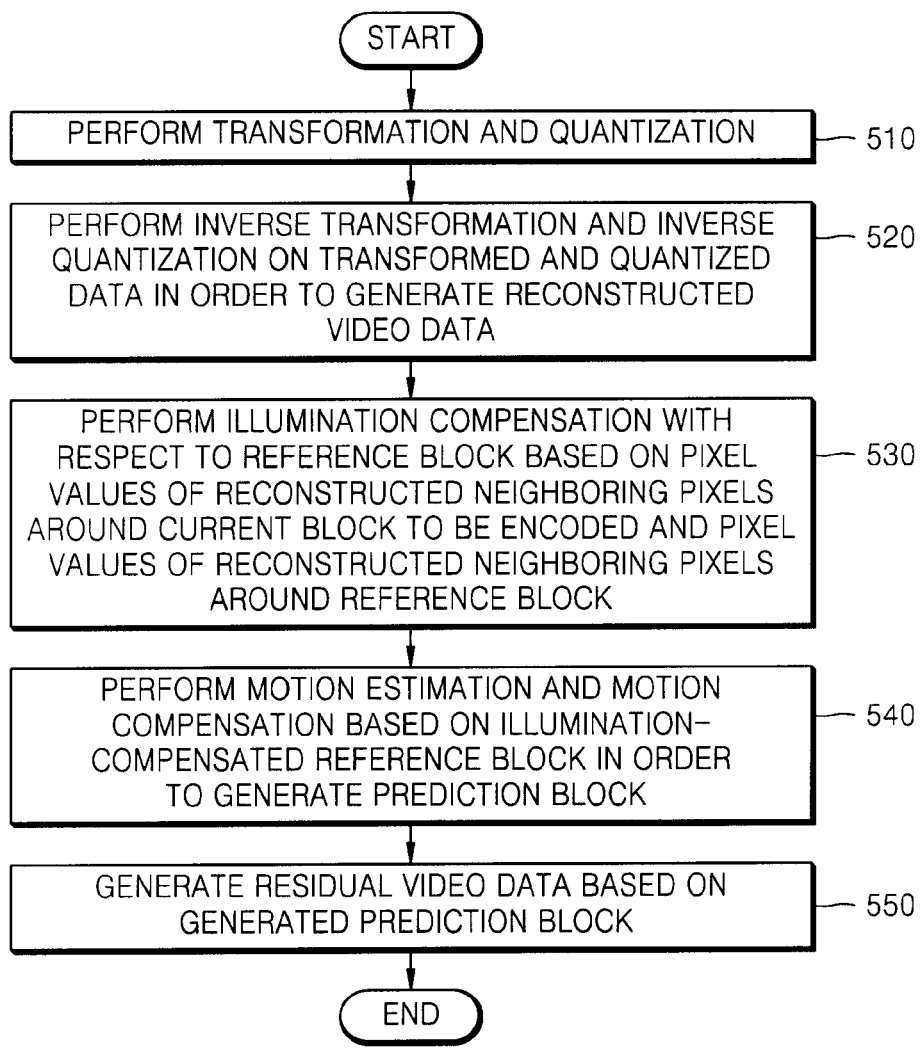
FIG. 5 is a flowchart illustrating a video encoding method using an illumination compensation method according to an exemplary embodiment of the present invention.

FIG. 5 is a flowchart illustrating a video encoding method implemented by the video encoding apparatus using the illumination compensation method according to an exemplary embodiment of the present invention.

In operation 510, transformation and quantization are performed.

In operation 520, inverse transformation and inverse quantization are performed on the transformed and quantized data in order to generate reconstructed video data.

In operation 530, illumination compensation is performed on a reference block based on pixel values of reconstructed neighboring pixels around the current block to be encoded and pixel values of reconstructed neighboring pixels around the reference block. In the current exemplary embodiment of the present invention, the reference block is a block included in a previous frame. However, when input video data is based on MVC, the reference block may be a block located in a frame of an adjacent view.

In operation 540, ME and MC are performed based on the illumination-compensated reference block in order to generate a prediction block.

In operation 550, residual video data is generated based on the original video data and the generated prediction block. Transformation and quantization are performed on the generated residual video data. The transformed and quantized residual video data is entropy-coded with a motion vector obtained by ME.

Figure 6:
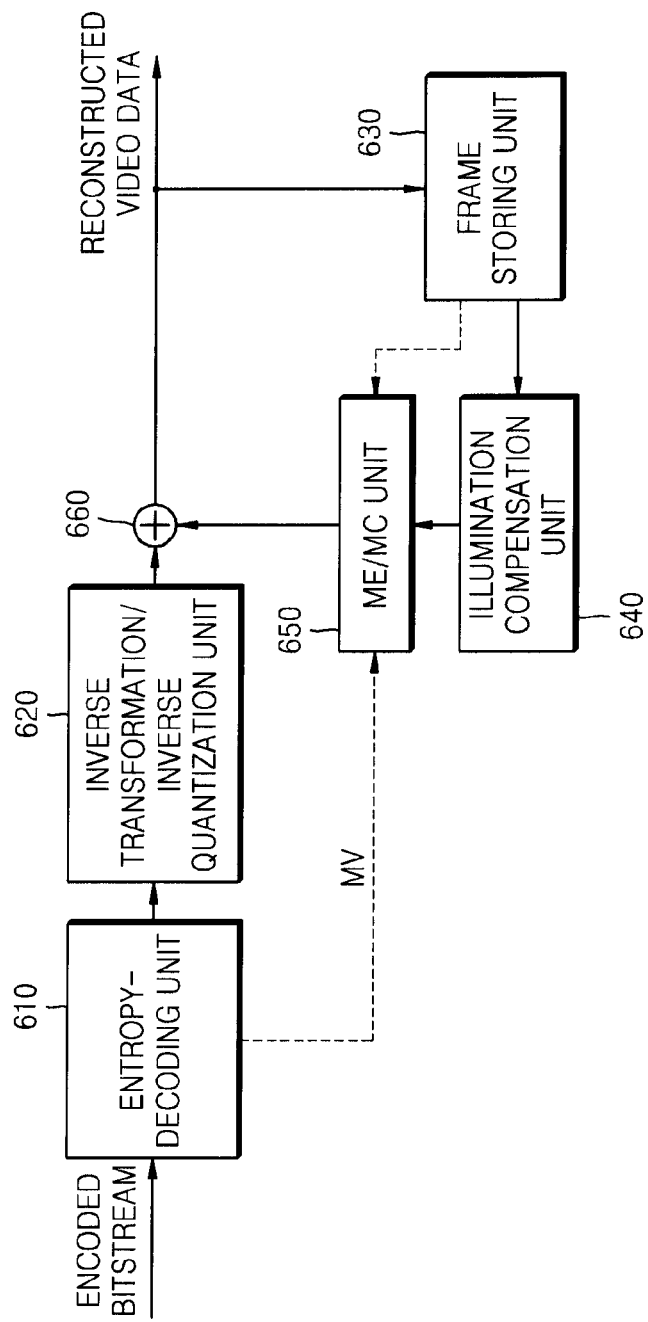
FIG. 6 is a block diagram of a video decoding apparatus using an illumination compensation method according to an exemplary embodiment of the present invention.

FIG. 6 is a block diagram of a video decoding apparatus using the illumination compensation method according to an exemplary embodiment of the present invention.

Referring to FIG. 6, the video decoding apparatus includes an entropy-decoding unit 610, an inverse quantization/inverse transformation unit 620, a frame storing unit 630, an illumination compensation unit 640, an ME/MC unit 650, and an addition unit 660.

The entropy-decoding unit 610 performs entropy-decoding on an input encoded bitstream in order to extract video data, motion vector information, and the like. The entropy-decoded video data is input to the inverse quantization/inverse transformation unit 620 and the motion vector information is input to the ME/MC unit 650.

The inverse transformation/inverse quantization unit 620 performs inverse transformation/inverse quantization on the video data that is extracted by the entropy-decoding unit 610.

The frame storing unit 630 stores the data that is inversely quantized and inversely transformed by the inverse transformation/inverse quantization unit 620 in frame units.

The illumination compensation unit 640 receives pixel values of reconstructed neighboring pixels around the current block and pixel values of reconstructed neighboring pixels around a reference block in order to generate an illumination-compensated reference block and outputs the generated illumination-compensated reference block to the ME/MC unit 650. The illumination compensation unit 640 functions in the same manner as the illumination compensation apparatus 100 illustrated in FIG. 1 and thus will not be described in detail for simplicity of explanation.

Optionally, when the video decoding apparatus illustrated in FIG. 6 is based on MVC, the reconstructed neighboring pixels around the reference block may be those located in a frame of an adjacent view. In this case, the reconstructed neighboring pixels around the reference block may be input from an MVC based reference frame storing unit (not shown).

The ME/MC unit 650 estimates a motion vector MV for each macroblock based on video data of the current frame and the illumination-compensated reference block output from the illumination compensation unit 640. The ME/MC unit 650 also generates a motion-compensated prediction area P based on the estimated motion vector, e.g., a 16×16 area selected by motion estimation, and outputs the motion-compensated prediction area P to the addition unit 660.

In other words, the ME/MC unit 650 obtains an illumination-compensated (IC) SAD corresponding to the current block based on the illumination-compensated reference block obtained by the illumination compensation unit 640. The ME/MC unit 650 also compares IC SADs and searches for a final motion vector.

The ME/MC unit 650 may also include a comparison unit (not shown). The comparison unit compares the efficiency of coding based on the input video data of the current frame and the illumination-compensated reference block output from the illumination compensation unit 640 with the efficiency of coding based on the input video data of the current frame and a non-illumination-compensated reference block output from the frame storing unit 630, and selects one having the higher efficiency. At this time, the ME/MC unit 650 generates the motion-compensated prediction area P obtained using selected ME/MC and outputs the motion-compensated prediction area P to the first addition unit 660.

The entropy decoding unit 610 may also extract flag information indicating whether illumination compensation is applied and the ME/MC unit 650 outputs a motion-estimated and motion-compensated prediction block based on an illumination-compensated reference block or based on a non-illumination-compensated reference block, which is determined by the extracted flag information to the addition unit 660.

The addition unit 660 adds video data reconstructed by the inverse transformation/inverse quantization unit 620 to a predictor output from the ME/MC unit 650 and outputs the addition result to a display unit (not shown) and the frame storing unit 630.

In the current exemplary embodiment of the present invention, the addition unit 660 adds a reconstructed residual signal residue'(p, q) for the residual signal residue(p,q) input from the inverse quantization/inverse transformation unit 620 to pixel values of the prediction block input from the ME/MC unit 650, thereby calculating a final reconstructed pixel f'(x, y) in the current block as follows:

$$f'(i,j) = \text{residue}'_{p,q}(i,j) + a_{p,q} \cdot r'(i,j) + b_{p,q} \quad (13),$$

where $a_{p,q}$ and $b_{p,q}$ differ with the motion vector (p, q) and are constants with respect to the motion vector (p, q).

Figure 7:
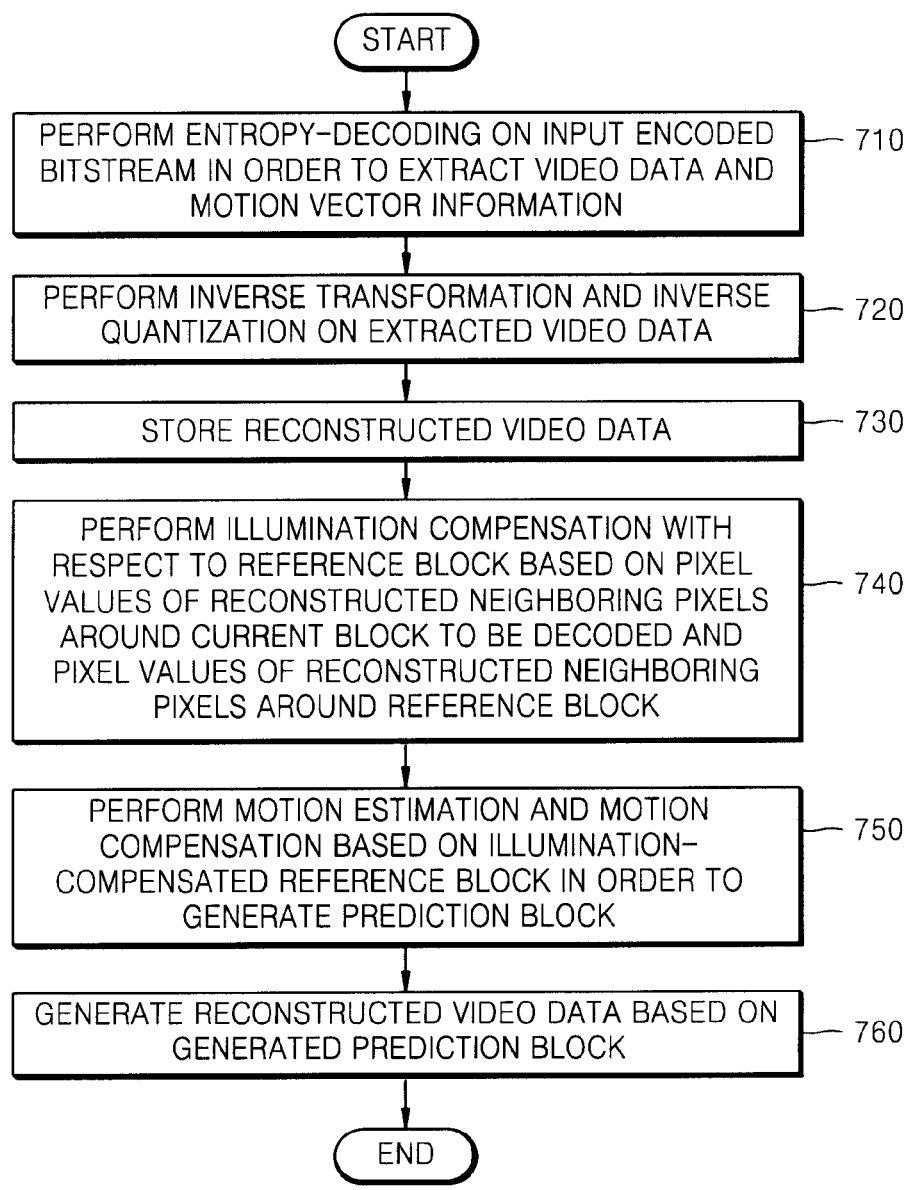
FIG. 7 is a flowchart illustrating a video decoding method using an illumination compensation method according to an exemplary embodiment of the present invention.

FIG. 7 is a flowchart illustrating a video decoding method implemented by the video decoding apparatus using the illumination compensation method according to an exemplary embodiment of the present invention.

In operation 710, an input encoded bitstream is entropy-decoded in order to extract video data and motion vector information.

In operation 720, inverse transformation and inverse quantization are performed on the extracted video data.

In operation 730, reconstructed video data obtained by inverse transformation and inverse quantization is stored in frame units.

In operation 740, illumination compensation is performed on a reference block based on pixel values of reconstructed neighboring pixels around the current block to be decoded and pixel values of reconstructed neighboring pixels around the reference block. When the input bitstream is based on MVC, the reconstructed neighboring pixels around the reference block are those located in a frame of an adjacent block.

In operation 750, ME and MC are performed based on the illumination-compensated reference block and the extracted motion vector information, thereby generating a prediction block.

In operation 760, reconstructed video data is generated using the generated prediction block. For example, the reconstructed video data is generated by adding the prediction block to the inversely transformed and inversely quantized video data.

Figures 8, 9:
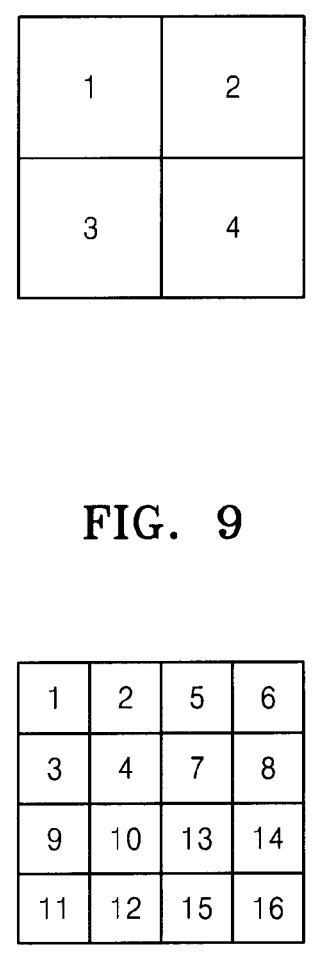

Illumination compensation and MC in an 8×8 mode will now be described with reference to FIG. 8.

In the 8×8 mode, a 16×16 block includes a total of four 8×8 sub blocks which have different motion vectors. In this case, a processing order is as illustrated in FIG. 8. Although the 8×8 mode uses an 8×8 sub block as a basic unit to be illumination-compensated, it operates in the same manner as a 16×16 mode. In other words, illumination compensation parameters $a_{x,y}$ and $b_{x,y}$ are obtained using linear regression, ADP, and DAP. The MC process in the 8×8 mode in the video encoding apparatus and the video decoding apparatus is the same as that in the 16×16 mode except that it uses an 8×8 block as a unit to be motion compensated.

Illumination compensation and MC in a 4×4 mode will now be described with reference to FIG. 9.

In the 4×4 mode, a 16×16 block includes a total of sixteen 4×4 sub blocks which have different motion vectors. In this case, a processing order is as illustrated in FIG. 9. Although the 4×4 mode uses a 4×4 sub block as a basic unit to be illumination-compensated, it operates in the same manner as a 16×16 mode. In other words, illumination compensation parameters $a_{x,y}$ and $b_{x,y}$ are obtained using linear regression, ADP, and DAP. The MC process in the 4×4 mode in the video encoding apparatus and the video decoding apparatus is the same as that in the 16×16 mode except that it uses a 4×4 block as a unit to be motion compensated.

Illumination compensation and MC in an adaptive mode will now be described.

In the adaptive mode, the video encoding apparatus may perform illumination compensation and encoding in units of a macroblock in the 16×16 mode, the 8×8 mode, and the 4×4 mode and select one of the 16×16 mode, the 8×8 mode, and the 4×4 mode. At this time, a residual block corresponding to each of the 16×16 mode, the 8×8 mode, and the 4×4 mode is encoded and transmitted. Mode information indicating a mode may be transmitted to the video decoding apparatus. Optionally, the mode information may not be transmitted if the video decoding apparatus can perform illumination compensation and ME in each of the 16×16 mode, the 8×8 mode, and the 4×4 mode.

Although the 16×16 mode, the 8×8 mode, and the 4×4 mode are taken as examples in the exemplary embodiments of the present invention, the illumination compensation method according to the present invention may also be applied to MC based on a block unit of other sizes or shapes.

The present invention may also be embodied as computer-readable information on a computer-readable recording medium. The computer-readable recording medium is any data storage device that can store data which can be thereafter read by a computer system. Examples of computer-readable recording media include read-only memory (ROM), random-access memory (RAM), CD-ROMs, magnetic tapes, floppy disks, and optical data storage devices. The computer-readable recording medium can also be distributed over networks of coupled computer systems so that the computer-readable code is stored and executed in a decentralized fashion.

As described above, according to exemplary embodiments of the present invention, it is not necessary to transmit illumination compensation parameters, thereby improving coding efficiency.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. An illumination compensation method comprising:
receiving pixel values of reconstructed neighboring pixels adjacent a current block to be encoded and pixel values of reconstructed neighboring pixels adjacent a reference block; and
performing illumination compensation with respect to the reference block based on the pixel values of reconstructed neighboring pixels adjacent the current block and the pixel values of reconstructed neighboring pixels adjacent the reference block,
wherein the reference block is a block included in a reference block among reconstructed frames of an adjacent view in multi-view coding.

2. The illumination compensation method of claim 1, further comprising:
calculating illumination compensation parameters for the illumination compensation with respect to the reference block based on a correlation between the pixel values of the reconstructed neighboring pixels adjacent the current block and the pixel values of the reconstructed neighboring pixels adjacent the reference block; and
generating an illumination-compensated reference block based on the calculated illumination compensation parameters.

3. The illumination compensation method of claim 1, wherein the performing of the illumination compensation comprises:
determining values of $a_{x,y}$ and $b_{x,y}$ that minimize J in the equation $$J = \sum_{i=0}^{15} [f'(i,-1) - a_{x,y} \times r'_{x,y}(i,-1) - b_{x,y}]^2 +$$

$$\sum_{j=0}^{15} [f'(-1,j) - a_{x,y} \times r'_{x,y}(-1,j) - b_{x,y}]^2; \text{ and}$$

generating the illumination-compensated reference block based on $\tilde{f}(i,j) = a_{x,y} \cdot r'_{x,y}(i,j) + b_{x,y}$ using the determined values of $a_{x,y}$ and $b_{x,y}$,
wherein $a_{x,y}$ and $b_{x,y}$ depend on a motion vector (x, y) and are constants with respect to the motion vector (x, y), f'(i,−1) and f'(−1,j) indicate the pixel values of the reconstructed neighboring pixels adjacent the current block, $r'_{x,y}(i,-1)$ and $r'_{x,y}(-1,j)$ indicate the pixel values of the reconstructed neighboring pixels adjacent the reference block, and $r'_{x,y}(i,j)$ indicates a motion-compensated reference block, and $\tilde{f}(i,j)$ indicates the illumination-compensated reference block.

4. The illumination compensation method of claim 1, wherein the performing of the illumination compensation comprises generating the illumination-compensated reference block using an average of differences between the pixel values of the reconstructed neighboring pixels adjacent the current block and the pixel values of the reconstructed neighboring pixels adjacent the reference block.

5. The illumination compensation method of claim 1, wherein the performing of the illumination compensation comprises generating the illumination-compensated reference block using a difference between an average of the pixel values of the reconstructed neighboring pixels adjacent the current block and an average of the pixel values of the reconstructed neighboring pixels adjacent the reference block.

6. The illumination compensation method of claim 1, wherein the performing the illumination compensation comprises:
performing the illumination compensation with respect to the reference block based on pixel values of reconstructed neighboring pixels of an other block adjacent to the current block and pixel values of reconstructed neighboring pixels of another reference block adjacent to the reference block, independently of any illumination compensation of the other reference block.

7. The illumination compensation method of claim 1, wherein the pixel values of reconstructed neighboring pixels adjacent the current block are pixel values on a border of the adjacent current block, directly adjacent to the current block, and the pixel values of reconstructed neighboring pixels adjacent the reference block are pixel values on a border of the reference block, directly adjacent to the reference block.

8. An illumination compensation apparatus comprising:
an illumination compensation unit which performs illumination compensation with respect to a reference block based on pixel values of reconstructed neighboring pixels adjacent a current block to be encoded and pixel values of reconstructed neighboring pixels adjacent the reference block,
wherein the reference block is a block included in a reference block among reconstructed frames of an adjacent view in multi-view coding.

9. The illumination compensation apparatus of claim 8, wherein the illumination compensation unit comprises:
a calculation unit calculating illumination compensation parameters for the illumination compensation with respect to the reference block based on a correlation between the pixel values of the reconstructed neighboring pixels adjacent the current block and the pixel values of the reconstructed neighboring pixels adjacent the reference block; and an illumination-compensated reference block generation unit which generates an illumination-compensated reference block based on the calculated illumination compensation parameters.

10. The illumination compensation apparatus of claim 8, wherein the illumination compensation unit comprises an illumination-compensated reference block generation unit that determines values of $a_{x,y}$ and $b_{x,y}$ that minimize J in the equation $$J = \sum_{i=0}^{15}[f'(i,-1) - a_{x,y} \times r'_{x,y}(i,-1) - b_{x,y}]^2 + \sum_{j=0}^{15}[f'(-1,j) - a_{x,y} \times r'_{x,y}(-1,j) - b_{x,y}]^2$$

and generates the illumination-compensated reference block based on $\tilde{f}(i,j) = a_{x,y} \cdot r'_{x,y}(i,j) + b_{x,y}$ using the determined values of $a_{x,y}$ and $b_{x,y}$, wherein $a_{x,y}$ and $b_{x,y}$ depend on a motion vector (x, y) and are constants with respect to the motion vector (x, y), f'(i,−1) and f'(−1, j) indicate the pixel values of the reconstructed neighboring pixels adjacent the current block, $r'_{x,y}$(i,−1) and $r'_{x,y}$(−1, j) indicate the pixel values of the reconstructed neighboring pixels adjacent the reference block, and $r'_{x,y}$(i, j) indicates a motion-compensated reference block, and $\tilde{f}$(i, j) indicates the illumination-compensated reference block.

11. The illumination compensation apparatus of claim 8, wherein the illumination compensation unit comprises an illumination-compensated reference block generation unit that generates the illumination-compensated reference block using an average of differences between the pixel values of the reconstructed neighboring pixels adjacent the current block and the pixel values of the reconstructed neighboring pixels adjacent the reference block.

12. The illumination compensation apparatus of claim 8, wherein the illumination compensation unit comprises an illumination-compensated reference block generation unit that generates the illumination-compensated reference block using a difference between an average of the pixel values of the reconstructed neighboring pixels around the current block and an average of the pixel values of the reconstructed neighboring pixels adjacent the reference block.

13. A video encoding method comprising:
performing illumination compensation with respect to a reference block used for motion estimation based on pixel values of reconstructed neighboring pixels adjacent a current block to be encoded and pixel values of reconstructed neighboring pixels around the reference block; and
performing motion estimation based on the illumination-compensated reference block,
wherein the reference block is a block included in a reference block among reconstructed frames of an adjacent view in multi-view coding.

14. The video encoding method of claim 13, wherein the performing of the illumination compensation comprises:
generating illumination compensation parameters for the illumination compensation with respect to the reference block based on a correlation between the pixel values of the reconstructed neighboring pixels adjacent the current block and the pixel values of the reconstructed neighboring pixels adjacent the reference block; and
generating an illumination-compensated reference block based on the generated illumination compensation parameters.

15. A video encoding apparatus comprising:
an illumination compensation unit which performs illumination compensation with respect to a reference block used for motion estimation based on pixel values of reconstructed neighboring pixels adjacent a current block to be encoded and pixel values of reconstructed neighboring pixels adjacent the reference block; and
a motion estimation unit which performs motion estimation based on the illumination-compensated reference block,
wherein the reference block is a block included in a reference block among reconstructed frames of an adjacent view in multi-view coding.

16. The video encoding apparatus of claim 15, further comprising:
an illumination compensation parameter generation unit which generates illumination compensation parameters for the illumination compensation with respect to the reference block based on a correlation between the pixel values of the reconstructed neighboring pixels adjacent the current block and the pixel values of the reconstructed neighboring pixels adjacent the reference block; and
an illumination-compensated reference block generation unit which generates an illumination-compensated reference block based on the generated illumination compensation parameters.

17. A video decoding method comprising:
performing illumination compensation with respect to a reference block used for motion compensation based on pixel values of reconstructed neighboring pixels adjacent a current block to be decoded and pixel values of reconstructed neighboring pixels adjacent the reference block; and
performing motion compensation based on the illumination-compensated reference block,
wherein the reference block is a block included in a reference block among reconstructed frames of an adjacent view in multi-view coding.

18. The video decoding method of claim 17, wherein the performing of the illumination compensation comprises:
generating illumination compensation parameters for the illumination compensation with respect to the reference block based on a correlation between the pixel values of the reconstructed neighboring pixels adjacent the current block and the pixel values of the reconstructed neighboring pixels adjacent the reference block; and
generating an illumination-compensated reference block based on the generated illumination compensation parameters.

19. A video decoding apparatus comprising:
an illumination compensation unit which performs illumination compensation with respect to a reference block used for motion compensation based on pixel values of reconstructed neighboring pixels adjacent a current block to be decoded and pixel values of reconstructed neighboring pixels adjacent the reference block; and
a motion compensation unit which performs motion compensation based on the illumination-compensated reference block, wherein the reference block is a block included in a reference block among reconstructed frames of an adjacent view in multi-view coding.

20. The video decoding apparatus of claim 19, wherein the illumination compensation unit comprises:
   an illumination compensation parameter generation unit which generates illumination compensation parameters for the illumination compensation with respect to the reference block based on a correlation between the pixel values of the reconstructed neighboring pixels adjacent the current block and the pixel values of the reconstructed neighboring pixels adjacent the reference block; and
   an illumination-compensated reference block generation unit which generates an illumination-compensated reference block based on the generated illumination compensation parameters.

21. A non-transitory computer-readable recording medium having recorded thereon a program for implementing an illumination compensation method, the illumination compensation method comprising:
   receiving pixel values of reconstructed neighboring pixels adjacent a current block to be encoded and pixel values of reconstructed neighboring pixels adjacent a reference block; and
   performing illumination compensation with respect to the reference block based on the pixel values of reconstructed neighboring pixels adjacent the current block and the pixel values of reconstructed neighboring pixels adjacent the reference block,
   wherein the reference block is a block included in a reference block among reconstructed frames of an adjacent view in multi-view coding.

22. A non-transitory computer-readable recording medium having recorded thereon a program for implementing a video encoding method, the video encoding method comprising:
   performing illumination compensation with respect to a reference block used for motion estimation based on pixel values of reconstructed neighboring pixels adjacent a current block to be encoded and pixel values of reconstructed neighboring pixels adjacent the reference block; and
   performing motion estimation based on the illumination-compensated reference block,
   wherein the reference block is a block included in a reference block among reconstructed frames of an adjacent view in multi-view coding.

23. A non-transitory computer-readable recording medium having recorded thereon a program for implementing a video decoding method, the video decoding method comprising:
   performing illumination compensation with respect to a reference block used for motion compensation based on pixel values of reconstructed neighboring pixels adjacent a current block to be decoded and pixel values of reconstructed neighboring pixels adjacent the reference block; and
   performing motion compensation based on the illumination-compensated reference block,
   wherein the reference block is a block included in a reference block among reconstructed frames of an adjacent view in multi-view coding.

* * * * *